United States Patent
Lee

(10) Patent No.: US 9,621,413 B1
(45) Date of Patent: Apr. 11, 2017

(54) DISPLAYING DYNAMIC HOST CONFIGURATION PROTOCOL (DHCP) TRANSACTION STATES USING A DHCP RELAY AGENT

(75) Inventor: Andrew Lee, Naperville, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 996 days.

(21) Appl. No.: 13/433,520

(22) Filed: Mar. 29, 2012

(51) Int. Cl.
*G06F 15/177* (2006.01)
*H04L 12/24* (2006.01)

(52) U.S. Cl.
CPC .................................. *H04L 41/08* (2013.01)

(58) Field of Classification Search
CPC ........................ H04L 41/0803; H04L 41/0806
USPC ........................................................ 709/220
See application file for complete search history.

(56) References Cited

U.S. PATENT DOCUMENTS

| | | | | |
|---|---|---|---|---|
| 7,293,282 | B2* | 11/2007 | Danforth et al. | 726/4 |
| 8,296,400 | B2* | 10/2012 | Gorthy et al. | 709/220 |
| 2004/0261116 | A1* | 12/2004 | Mckeown et al. | H04L 12/24 725/109 |
| 2007/0276905 | A1* | 11/2007 | Durand et al. | 709/203 |
| 2010/0191839 | A1* | 7/2010 | Gandhewar et al. | 709/220 |

* cited by examiner

*Primary Examiner* — Glenford Madamba
(74) *Attorney, Agent, or Firm* — Stewart M. Wiener

(57) ABSTRACT

Systems and methods can operate to improve the identification and diagnoses of DHCP client IP address assignment failures. The DHCP protocol can require a plurality of DHCP messages to be exchanged by DHCP server, relay agent and clients. Failure of DHCP message delivery can result in a DHCP client not obtaining an IP address. DHCP information can be displayed and captured in the DHCP relay agent that can assist in the identification and diagnosing of DHCP client IP address assignment failures.

20 Claims, 4 Drawing Sheets

DISPLAYING DYNAMIC HOST CONFIGURATION PROTOCOL (DHCP) TRANSACTION STATES USING A DHCP RELAY AGENT

TECHNICAL FIELD

This disclosure relates to identifying issues associated with the assignment of internet protocol (IP) addresses using the dynamic host configuration protocol (DHCP).

BACKGROUND

Network attached devices can have one or more unique IP addresses to communicate on an IP network. In some implementations the network attached device can be assigned one or more IP addresses that can be statically configured in the network attached device. The static configuration of IP addresses can result in an operational burden for entities (e.g., service operators) since they are required to maintain a list of IP addresses with attributes of assigned and unassigned. The entity can be unaware of the failure of a network attached device that will never be used again and maintain the attribute of assigned to the one or more IP addresses assigned to the failed network attached device. Unassigned IP addresses especially in internet protocol version four (IPv4) based networks are limited.

The DHCP protocol can be used to provide network attached devices with one or more IP addresses. The DHCP protocol can include the logical components of a client, relay agent and server. The network attached device can represent a DHCP client. When the network attached device requires an IP address (e.g., caused by power on, reset, etc.) it can generate DHCP client messages that can be broadcasted. A DHCP client relay can be used to forward the DHCP client messages to the DHCP server. The DHCP server can communicate through a DHCP relay agent with the DHCP client with a plurality of messages that can result in the assignment of an IP address. Any issues associated with the IP network DHCP client, DHCP relay, or DHCP server can result in the network attached device being unable to obtain one or more IP address, and thus being unable to communicate on the IP network.

BRIEF DESCRIPTION OF THE DRAWINGS

Like reference numbers and designations in the various drawings indicate like elements.

DETAILED DESCRIPTION

In some implementations of this disclosure, improved methods, systems, and apparatus can operate to identify and diagnose the case where a network attached device cannot obtain one or more IP address through use of DHCP. The DHCP protocol consists of several messages that are exchanged between a network attached device and a DHCP server. Failure of DHCP message delivery can result in the network attached device not obtaining an IP address. A DHCP relay can be used between the DHCP server and network attached device operable to communicate DHCP messages to/from the DHCP server and network attached device. The DHCP relay can display and/or log the DHCP message exchanges between the DHCP server and network attached device enabling a network operator to identify the DHCP message or lack of that resulted in the network attached device not obtaining a IP address.

Figure 1:
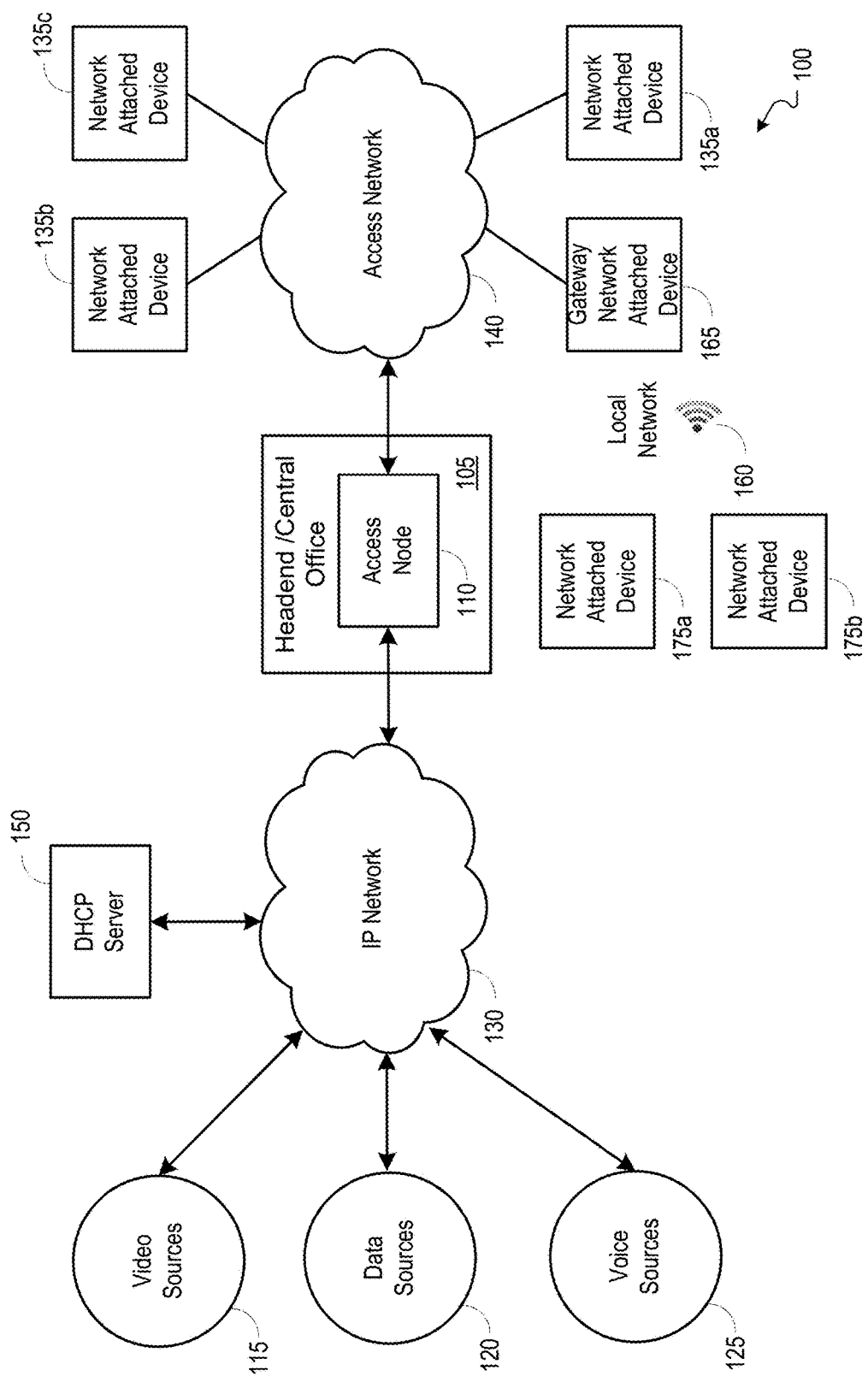
FIG. 1 is a block diagram illustrating an example network environment operable to identify and diagnose a network attached device failure to obtain one or more IP addresses through the use of DHCP.

FIG. 1 is a block diagram illustrating an example network environment operable to identify and diagnose a gateway network attached device and/or network attached device failure to obtain one or more IP addresses through the use of DHCP. In some implementations, a headend or central office 105 can provide video, data and voice communication services to subscribers. The headend or central office 105 can include an access node 110. Information, including voice, data and video streams, among others, can be provided from video source 115, data source 120 and voice source 125 (or sources) through an IP network 130.

Communication services can be handled by the headend or central office 105 through an access node 110. The access node 110 can receive information signals from one or more gateway network attached devices 165 (though only one is shown in the example of FIG. 1) and network attached devices(s) 135a-c through an access network 140.

The access network 140 can be a wired or wireless access network including a hybrid fiber-cable (HFC) data over cable service interface specification (DOCSIS) based community antenna television (CATV), digital subscriber line (DSL), fiber-to-the-premise (FTTP), fiber-to-the-curb (FTTC) worldwide interoperability for microwave access (WiMAX) and 3G/4G (e.g., third/fourth generation) networks, among many others. The access network can communicate information packets between the access node 110 and the gateway network attached device 165 and network attached device(s) 135a-c.

The access node 110 can forward packets received from network 130 to a downstream PHY producing a downstream signal meeting the access network requirements. The downstream signal can include data and video streams, in both multicast (e.g., point-to-multipoint) and unicast (e.g., point-to-point) formats for transmission to the gateway attached network device 165 and one or more network attached device(s) 135a-c via the access network 140. In some implementations, gateway network attached device 165 and network attached device(s) 135a-c can be personal computers with integrated or external modems (e.g., cable modems, media terminator adaptors, DSL modems or broadband modems), set top boxes, routers or mobile phones. In other implementations a gateway network attached device 165 can provide local network access to one or more network attached device(s) 175a-b through a wired (not shown) or an 802.11 wireless connection 160.

The headend/central office 105 can include network equipment to provide access to the access network 140, to provide access to an IP network 130 and equipment required to offer and operate network services.

The DHCP server 150 can be operable to assign IP addresses for devices using DHCP to communicate on the IP network 130. In some implementations the DHCP server 150 can be co-located with the access node 110 in the headend/central office 105 (not shown).

In some implementations, the access node 110 can include a DHCP relay agent operable to relay DHCP messages to/from DHCP clients (e.g., a gateway network attached device 165 and network attached device(s) 135*a-c*) and the DHCP server 150. In other implementations, an access node 110 can include DHCP server functionality (not shown).

In other implementations, the gateway network attached device 165 can be operable as a DHCP client for communication over the IP network 130 and operable as a DHCP server and relay agent for network attached devices 175*a-b* for communication over the local network 160. An example of a gateway network access device 165 operable as a DHCP client, relay agent and server can be a cable modem integrated with gateway functionality operable to perform routing, DHCP server, network address translation (NAT) and port forwarding.

Figure 2:
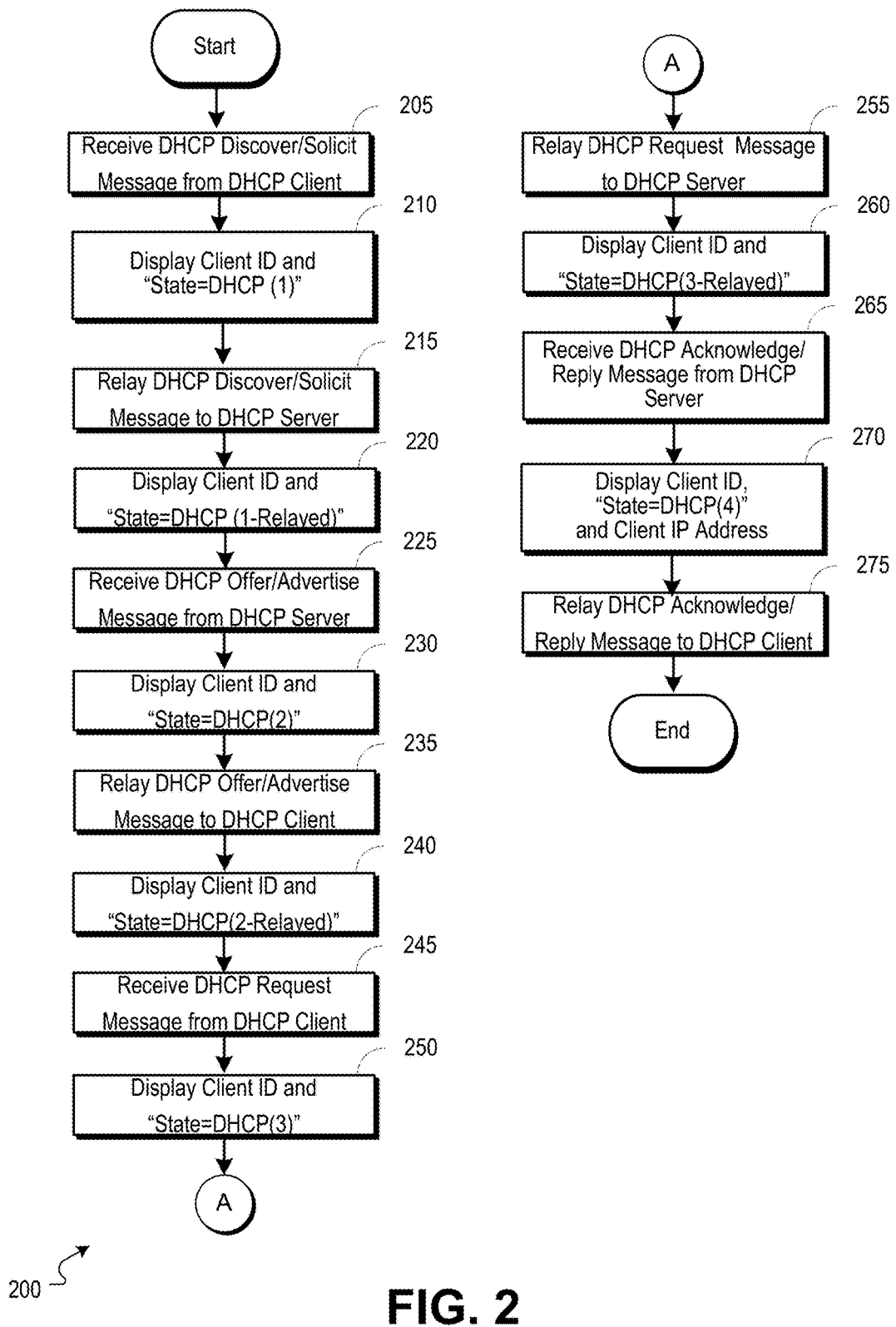
FIG. 2 is a flowchart illustrating an example process of a DHCP relay agent operable to capture the states of DHCP messages between a DHCP server and client.

FIG. 2 is a flowchart illustrating an example process of a DHCP relay agent operable to display the states of DHCP messages between a DHCP server and client. At stage 205, a DHCP discover/solicit message is received from a DHCP client. In some implementations the access node (e.g., access node 110 in FIG. 1) can be operable to provide DHCP relay agent functionality and can receive DHCP discover/solicit messages from the gateway network attached device (e.g., gateway network attached device 165 of FIG. 1) and network attached device(s) (network attached device(s) 135*a-c* of FIG. 1) operable to provide DHCP client functionality. In other implementations, the gateway network attached device (e.g., gateway network attached device 165 of FIG. 1) can be operable to provide DHCP relay agent functionality and can receive a DHCP discover/solicit message from network attached device(s) (e.g., network attached devices 175*a-b* of FIG. 1) operable to provide DHCP client functionality.

At stage 210, the client ID and state (e.g., "State=DHCP (1)") are displayed. The DHCP relay agent can display the DHCP client identification and "State=DHCP (1)", indicating the DHCP discover/solicit message was received from DHCP client. In some implementations, the DHCP client identification can be the client's media access control address (MAC).

At stage 215, the DHCP discover/solicit message is relayed to the DHCP server. The DHCP relay agent can relay the DHCP discover/solicit message to a DHCP server (e.g., DHCP server 150 of FIG. 1). In some implementations the gateway network attached device can be operable to provide DHCP server functionality.

At stage 220, the client ID and state (e.g., "State=DHCP (1-Relayed)" are displayed. The DHCP relay agent can display the DHCP client identification and "State=DHCP (1-Relayed)", indicating the DHCP discovery/solicit message was sent to the DHCP server.

At stage 225, the DHCP offer/advertise message is received from the DHCP server. The DHCP relay agent can receive a DHCP offer/advertise message from the DHCP server.

At stage 230, the client ID and state (e.g., "State=DHCP (2)") are displayed. The DHCP relay agent can display the DHCP client identification and "State=DHCP (2)", indicating the DHCP offer/advertise message was received from the DHCP server.

At stage 235, the DHCP offer/advertise message is relayed to the DHCP client. The DHCP relay agent can relay the DHCP offer/advertise message to the DHCP client.

At stage 240, the client ID and state (e.g., "State=DHCP (2-Relayed)") are displayed. The DHCP relay agent can display the DHCP client identification and "State=DHCP (2-Relayed)", indicating the DHCP offer/advertise message was sent to the DHCP client.

At stage 245, the DHCP request message is received from the DHCP client. The DHCP relay agent can receive a DHCP request message from the DHCP client.

At stage 250, the client ID and state (e.g., "State=DHCP (3)") are displayed. The DHCP relay agent can display the DHCP client identification and "State=DHCP (3)", indicating the DHCP request message was received from the DHCP client.

At stage 255, the DHCP request message is relayed to the DHCP server. The DHCP relay agent can relay the DHCP request message to the DHCP server.

At stage 260, the client ID and state (e.g., "State=DHCP (3-Relayed)") are displayed. The DHCP relay agent can display the DHCP client identification and "State DHCP=(3-Relayed)", indicating the DHCP request message was sent to the DHCP server.

At stage 265, the DHCP acknowledge/reply message is received by the DHCP server. The DHCP relay agent can receive a DHCP acknowledge/reply message from the DHCP server.

At stage 270, the client ID and state (e.g., "State=DHCP (4)") are displayed. The DHCP relay agent can display the DHCP Client identification, "State=DHCP (4)" and the client IP address indicating the DHCP acknowledge/reply message was received from the DHCP server. In some implementations the IP address can be an internet protocol version four (IPv4) address. In other implementations, the IP address can be an internet version six (IPv6) address.

At stage 275, the DHCP acknowledge/reply message is sent to the DHCP client the DHCP relay agent can relay the DHCP acknowledge/reply message to the DHCP client.

Figure 3:
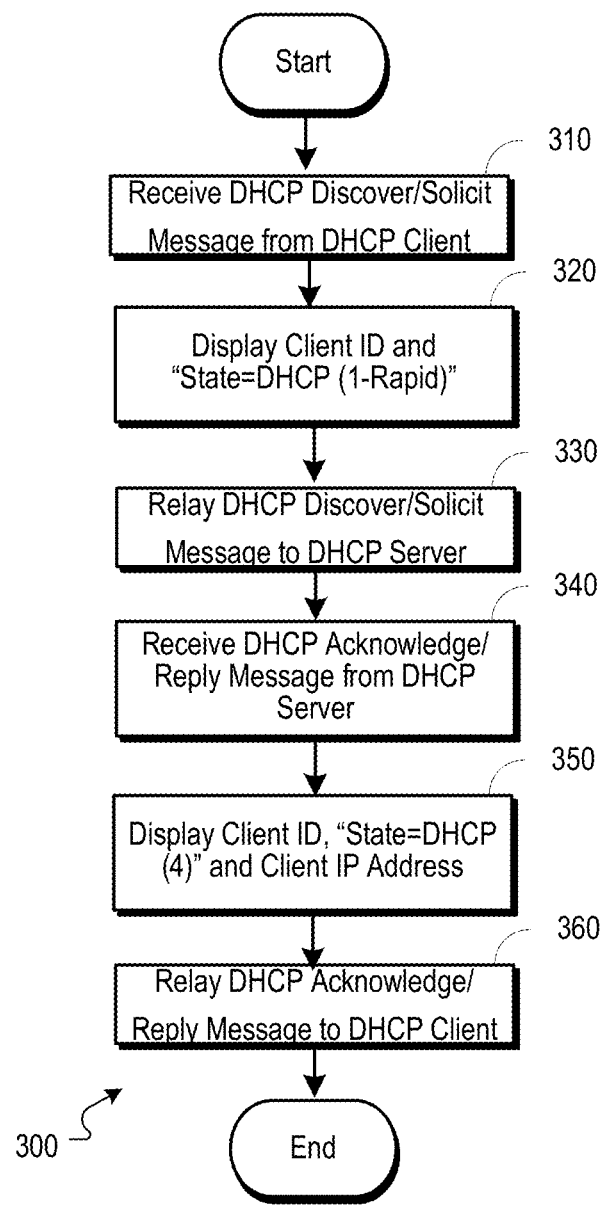
FIG. 3 is a flowchart illustrating an example process of a DHCP version 6 (DHCPv6) relay agent operable to capture the states of rapid commit DHCP messages between a DHCP server and client.

FIG. 3 is a flowchart illustrating an example process of a DHCP version 6 (DHCPv6) relay agent operable to capture the states of rapid commit DHCP messages between a DHCP server and client. At stage 310, a discover/solicit DHCP message is received. In some implementations the access node (e.g., access node 110 in FIG. 1) can be operable to provide DHCP relay agent functionality and can receive a DHCP discover/solicit message from the gateway network attached device (e.g., gateway network attached device 165 of FIG. 1) and network attached device(s) (network attached device(s) 135*a-c* of FIG. 1) operable to provide DHCP client functionality. In other implementations, the gateway network attached device (e.g., gateway network attached device 165 of FIG. 1) can be operable to provide DHCP relay agent functionality and can receive a DHCP discover/solicit message from network attached device(s) (e.g., network attached devices 175*a-b* of FIG. 1) operable to provide DHCP client functionality.

At stage 320, the client ID and state (e.g., "State=DHCP (1-Rapid)") are displayed. The DHCP relay agent can display the DHCP client identification and "State=DHCP (1-Rapid)", indicating the DHCP discover/solicit message was received from DHCP client. In some implementations, the DHCP client identification can be the client's media access control address (MAC).

At stage 330, the DHCP discover/solicit message is relayed to the DHCP server. The DHCP relay agent can relay the DHCP discover/solicit message to a DHCP server (e.g., DHCP server 150 of FIG. 1). In some implementations the gateway network attached device can be operable to provide DHCP server functionality.

At stage 340, the DHCP acknowledge/reply message is received by the DHCP server. The DHCP relay agent can receive a DHCP acknowledge/reply message from the DHCP server.

At stage 350, the client ID and state (e.g., "State=DHCP (4)") are displayed. The DHCP relay agent can display the DHCP client identification, "State=DHCP (4)" and the clients IP address indicating the DHCP acknowledge/reply message was received from the DHCP server. In some implementations, the IP address can be an internet protocol version four (IPv4) address. In other implementations, the IP address can be an internet version six (IPv6) address.

At stage 360, the DHCP acknowledge/reply message is sent to the DHCP client. The DHCP relay agent can relay the DHCP acknowledge/reply message to the DHCP client.

In some instances, the DHCP server, relay agent, and/or DHCP client does not generate and/or receive a DHCP message. Some such instances can result in the gateway network attached device (e.g., gateway network attached device 165 of FIG. 1) and/or network attached devices (network attached device(s) 135a-c of FIG. 1) not being assigned an IP address. Without an IP address the gateway network attached device and network attached device(s) cannot communicate over the IP network (e.g., IP network 130 of FIG. 1).

In other instances, the DHCP server, relay agent, and/or DHCP client does not generate and/or receive a DHCP message which results in the network attached device(s) (e.g., network attached device(s) 175a-c of FIG. 1) not being assigned an IP address. Without an IP address the network attached device(s) cannot communicate over the local network (e.g., local network 160 of FIG. 1).

In some implementations, a network operator can access the display output of the relay agent (e.g., process 200 of FIG. 2 and process 300 of FIG. 3) in the access node (e.g., access node 110 of FIG. 1) to identify and diagnose the cause of the gateway network attached device (e.g., gateway network attached device 165) or network attached device(s) (e.g., network attached device 135a-c of FIG. 1) failure to obtain an IP address. In some implementations, the network operator can display DHCP information for a single DHCP client based on the client's identification. In other implementations DHCP information for all DHCP clients can be displayed.

In some implementations the network operator can access the display output of the relay agent (e.g., process 200 of FIG. 2 and process 300 of FIG. 3) in the gateway network attached device (e.g., gateway network attached device 165 of FIG. 1) to identify and diagnose the cause of the network attached device(s) (e.g., network attached device(s) 175a-b of FIG. 1) failure to obtain an IP address. In some implementations, the network operator can display DHCP information for a single DHCP client based on the client's identification. In other implementations DHCP information for all DHCP clients can be displayed.

In some implementations an network operator can access the DHCP relay agent display in the access node or the gateway network attached device through the input/output interface (e.g., input/output interface 440 of FIG. 4) using secure Shell, tty, telnet, hypertext transport protocol (HTTP), secure HTTP (HTTPS), simple network management protocol (SNMP) and/or the TR-069 CPE WAN Management protocols.

The assignment of one or more IP addresses using the DHCP protocol to the gateway network attached device (e.g., gateway network attached device 165 of FIG. 1) and/or the network attached device(s) (e.g., network attached device(s) 135a-c and 175a-b of FIG. 1) can fail intermittently. The identification and diagnosis of intermittent failures can be difficult. In some implementations, the relay agent can redirect all DHCP message (e.g., process 200 FIG. 2 and process 300 of FIG. 3), can display DHCP message information, or can output the DHCP message information to a log file. In other implementations, DHCP messages containing a unique DHCP client identification can be captured in the log file.

Figure 4:
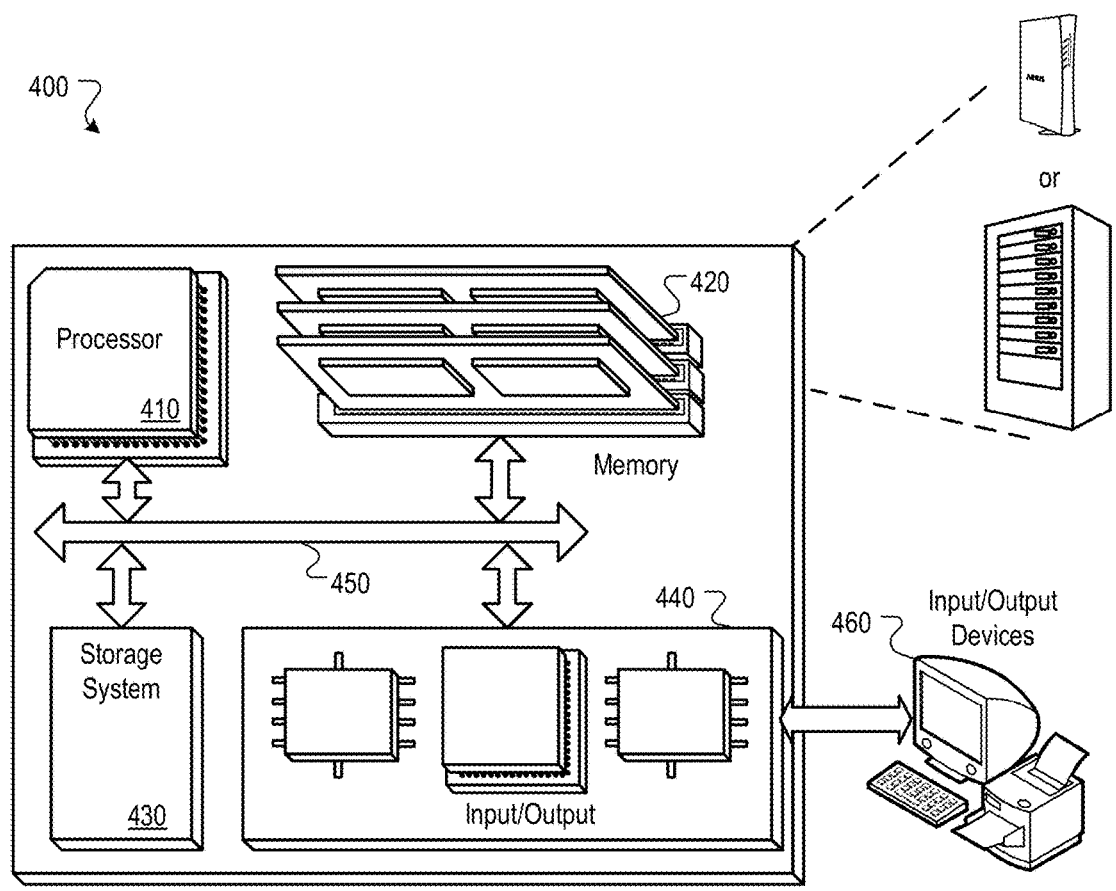
FIG. 4 is a block diagram illustrating an example of an access node, gateway network attached device and network attached device(s) operable to obtain IP addresses using DHCP.

The log file created by the DHCP relay agent in the access node (e.g. access node 110 of FIG. 1) and the gateway attached network device (e.g., gateway attached network device 165 of FIG. 1) can be access by a network operator through the input/output interface (e.g., input/output interface 440 of FIG. 4). The log file stored at the DHCP relay agent(s) can be accessed using any of Secure Shell, tty, telnet, file transfer protocol (FTP), trivial FTP (TFTP), HTTPS, HTTP, SNMP and/or the TR-069 CPE WAN Management protocols. Accessing the log file can help an administrator identify an assigned client IP address in the access node and/or gateway network attached device or troubleshoot problems with assigning the client IP address.

FIG. 4 is a block diagram illustrating an example of an access node (e.g., access node 110 of FIG. 1), gateway network attached device (e.g., gateway network attached device 165) and network attached device(s) (e.g., network attached devices 135a-c and 175a-b) operable to obtain IP addresses using DHCP. The access node, gateway network attached device and network attached devices 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the access node, gateway network attached device and network attached device(s) 400. In one implementation, the processor 410 is a single-threaded processor. In another implementation, the processor 410 is a multi-threaded processor. The processor 410 is capable of processing instructions stored in the memory 420 or on the storage device 430. The processor 410 can be a complex of one or more processors.

The memory 420 stores information within the access node, gateway network attached device and network attached device(s) 400. The memory 420 is a computer-readable medium. In various implementations, the memory 420 can include a volatile memory unit, a non-volatile memory unit, or combinations thereof.

In some implementations, the storage device 430 is capable of providing mass storage for the access node, gateway network attached device and network attached device(s) 400. In some implementations, the storage device 430 is a computer-readable medium. In various different implementations, the storage device 430 can, for example, include a hard disk device, an optical disk device, flash memory or some other large capacity storage device.

The input/output device 440 provides input/output operations for the access node, gateway network attached device and network attached device(s) 400. In some implementations, the input/output device 440 can include one or more interfaces for enabling communication through RS-232, ethernet, USB, 802.11x, CATV, DSL PSTN, FTTC, FTTH, 3G/4G, and 802.16 networks. In another implementation, the input/output device can include driver devices configured to receive input data and send output data to other input/output devices, such as one or more computers as well as sending communications to, and receiving communications from a network (not shown). Other implementations, however, can also be used, such as mobile computing devices, mobile communication devices, set-top box television client devices, etc.

The communications device (e.g., cable modem, set top box, media terminal adapter, cable modem termination system, mobile phones, tablet computers, personal computers, personal digital assistances, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method, comprising:
   waiting to receive one or more Dynamic Host Configuration Protocol (DHCP) client messages, wherein the DHCP client messages include a DHCP client identification, and wherein upon reception the DHCP client messages are relayed to a DHCP server and captured;
   waiting to receive one or more DHCP server messages, wherein the DHCP server messages include the DHCP client identification, and wherein upon reception the DHCP server messages are relayed to a DHCP client and captured; and
   displaying over a command line interface captured DHCP client identification and message type associated with any DHCP client or server messages received;
   displaying over the command line interface a relayed DHCP message type associated with any DHCP client or server messages.

2. The method of claim 1, wherein the captured DHCP messages and client identification are written to a log file.

3. The method of claim 2, wherein the log file can be accessed through one of a secure shell protocol, telnet, and serial connection.

4. The method of claim 1, wherein said client identification and message type are limited to specific DHCP client messages and DHCP server messages with a specified DHCP client identification.

5. The method of claim 4, wherein the display information is written to a log file.

6. The method of claim 1, wherein the method is performed by an access node.

7. The method of claim 6, wherein said captured client identification and message type are accessed through one of the secure shell protocol, telnet, and serial connection.

8. The method of claim 1, wherein the method is performed by a gateway network attached device operable to provide an 802.11 local network.

9. The method of claim 8, wherein said captured client identification and message type are accessed through one of hypertext transfer protocol secure, serial connection, and telnet.

10. The method of claim 1, wherein the DHCP client identification comprises an ethernet media access control address.

11. The method of claim 1, wherein the IP address is an IPv4 address.

12. The method of claim 1, wherein the IP address is an IPv6 address.

13. A computer-implemented method comprising:
    receiving a Dynamic Host Configuration Protocol (DHCP) discover message from a DHCP client, wherein the DHCP discover message includes the DHCP client identification;
    displaying the DHCP client identification and DHCP client message type and displaying actions taken by a relay agent using a command line interface;
    relaying the DHCP discover message from the relay agent to a DHCP server;
    receiving a DHCP acknowledge message from a DHCP server, wherein the DHCP acknowledge message includes the client identification and IP address;
    displaying the DHCP client identification and DHCP server message type and displaying actions taken by the relay agent using a command line interface;
    capturing the DHCP client identification and the IP address.

14. The method of claim 13, wherein the DHCP client identification, DHCP client message type and DHCP server message type and IP address for any received and relayed DHCP message are written to a log file.

15. The method of claim 14, wherein the log file can be accessed through one of the trivial file transfer protocol, telnet, secure shell protocol and serial connection.

16. The method of claim 14, wherein displaying is limited to specific DHCP client messages and DHCP server messages with a specified DHCP client identification.

17. The method of claim 16, wherein DHCP client identification, DHCP client message type, DHCP server message type, and IP address for any received and relayed DHCP message are written to a log file.

18. A system, comprising:
    a Dynamic Host Configuration Protocol (DHCP) client;
    a DHCP server;
    a DHCP relay agent operable to relay DHCP messages between the DHCP client and DHCP server;
    the DHCP relay agent operable to capture DHCP client identification, DHCP client message types and DHCP server message types;
    the DHCP relay agent operable to receive one or more DHCP client messages, wherein the DHCP client messages include a DHCP client identification; and
    the DHCP relay agent being operable to display a DHCP transaction including the captured DHCP client identification, DHCP client message types and DHCP server message types through a command line interface.

19. The system of claim 18, wherein the computer-implemented method is performed by an access node operable for communications in a DOCSIS access network.

20. The system of claim 18, wherein the computer-implemented method is performed by a gateway network attached device operable for communications in a DOCSIS access network.

* * * * *